Oct. 6, 1970 P. M. METTERT 3,532,957
OSCILLATING MOTOR APPARATUS
Filed Jan. 24, 1968

INVENTOR.
PAUL M. METTERT
BY Bruce C Lutz
ATTORNEY

United States Patent Office 3,532,957
Patented Oct. 6, 1970

3,532,957
OSCILLATING MOTOR APPARATUS

Paul M. Mettert, Seattle, Wash., assignor to Honeywell Inc., Minneapolis, Minn., a corporation of Delaware
Filed Jan. 24, 1968, Ser. No. 700,150
Int. Cl. G05b
U.S. Cl. 318—627 2 Claims

ABSTRACT OF THE DISCLOSURE

A circuit for providing an alternating triangular wave whose waveform slopes are linear by using constant current generators to both charge and discharge a capacitor. This oscillator is used in a bridge circuit for providing a mechanical oscillation output from a motor.

THE INVENTION

The present invention pertains generally to electronics and more specifically to a novel triangular waveform generator.

The present invention utilizes constant current generators for both charging and discharging a capacitor whose output potential is sampled by two voltage level sensors which actuate a bistable multivibrator to start the charging generator operating when the output potential reaches a predetermined low potential and later to disengage the charging circuit and engage the discharging circuit when it reaches a predetermined high potential.

It is therefore an object of this invention to provide an improved waveform generator.

Figure 1:
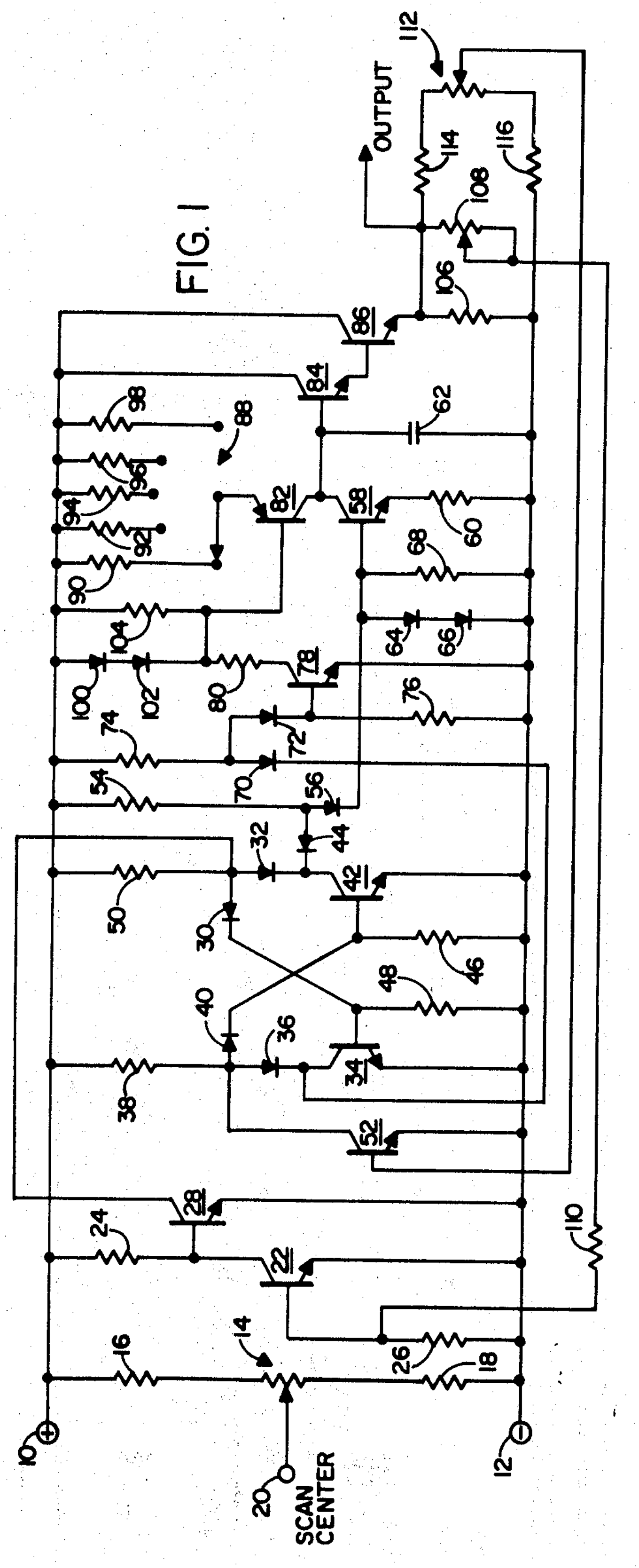
Figure 2:
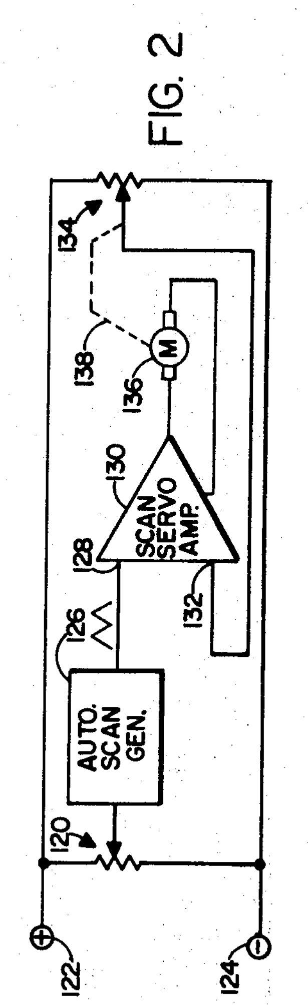

Further objects and advantages of this invention will be apparent from a reading of the specification and appended claims in conjunction with the drawings wherein:

FIG. 1 is a detailed circuit diargram of one embodiment of the waveform generator; and FIG. 2 is a block diagram of the oscillator of FIG. 1 used to produce an oscillating mechanical motion.

In FIG. 1 terminals 10 and 12 provide positive and negative power respectively. A resistance winding of a potentiometer generally designated as 14 has one end connected through a resistor 16 to terminal 10 and the other end connected through a resistor 18 to terminal 12. A wiper of potentiometer 14 is connected to an output 20 which may be used as a reference potential for the output waveform. An NPN transistor 22 has a collector connected through a resistor 24 connected to terminal 10 while an emitter thereof is connected to terminal 12. A base of transistor 22 is connected through a resistor 26 to terminal 12. The collector of transistor 22 is also connected to an NPN transistor 28 via a base thereof while an emitter thereof is connected to terminal 12. A collector of transistor 28 is connected to the anodes of a pair of diodes 30 and 32. A cathode of diode 30 is connected to a base of an NPN transistor 34 having an emitter connected to terminal 12 and a collector connected to a cathode of a diode 36 whose anode is connected through a resistor 38 to terminal 10. A diode 40 has its anode connected to the anode of diode 36 and its cathode connected to a base of an NPN transistor 42 whose emitter is connected to terminal 12 whose collector is connected to a cathode of diode 32 and to a cathode of a diode 44. A base of transistor 42 is connected through a resistor 46 to terminal 12 while a base of transistor 34 is connected through a resistor 48 to terminal 12. The collector of transistor 28 is also connected through a resistor 50 to terminal 10. A transistor 52 has an emitter connected to terminal 12 while a collector thereof is connected to the anode of diode 36. An anode of diode 44 is connected through a resistor 54 to terminal 10 and also to an anode of a diode 56. A cathode of diode 56 is connected to a base of an NPN transistor 58 whose emitter is connected through a resistor 60 to terminal 12 and whose collector is connected through an integrating capacitor 62 to terminal 12. A pair of diodes 64 and 66 are connected in series to provide a direction of easy current flow from terminal 10 through resistor 54 and diode 56 to terminal 12. In parallel with diodes 64 and 66 is a resistor 68. A pair of diodes 70 and 72 have their anodes connected together and connected through a resistor 74 to terminal 10. A cathode of diode 70 is connected to the collector of transistor 34 while a cathode of diode 72 is connected to terminal 12 through resistor 76 and also to a base of an NPN transistor 78 whose emitter is connected to terminal 12. A collector of transistor 78 is connected through a resistor 80 to a base of a PNP transistor 82 whose collector is connected to a collector transistor 58 and also to a base of an NPN transistor 84 whose collector is connected to terminal 10 and whose emitter is connected to a base of an NPN transistor 86. An emitter of transistor 82 is connected to a switch generally designated as 88 having a movable contact which connects the emitter of transistor 82 selectively to a plurality of contacts which are respectively connected to terminal 10 through resistors 90, 92, 94, 96, and 98. A pair of diodes 100 and 102 are connected in series between terminal 10 and the base of transistor 82 in a direction to provide easy current flow towards the base of transistor 82. A resistor 104 is also connected between terminal 10 and the base of transistor 82. The diodes 64 and 66 as well as the diodes 100 and 102 are utilized to provide a constant bias voltage to transistors 58 and 82 respectively so as to produce constant current generators. A collector of transistor 86 is connected to terminal 10 while an emitter is connected through a resistor 106 to terminal 12. A variable resistor 108 is connected from the emitter of transistor 86 through a resistor 110 to the base of transistor 22. A potentiometer generally designated as 112 has one end connected through a resistor 114 to the emitter of transistor 86 and the other end connected through a resistor 116 to terminal 12. The wiper of potentiometer 112 is connected to a base of transistor 52.

While the term diode has been used in describing FIG. 1, it is to be realized that the broader terms asymmetrical conducting means and unilateral conducting means as well as rectifying means are also applicable. Further, combinations of diodes may be utilized to produce logic means. The transistors, while recited as such, are also amplifying means and switching means in appropriate circumstances. Further, the capacitor 62 is utilized for energy storage purposes and receives a charging current from a constant currrent regulator or source utilizing transistor 82 and its biasing networks while it is discharged by a constant current regulator or source utilizing transistor 58 and its associated biasing networks. The transistors 34 and 42 and their associated components comprise a bistable multivibrator or flip-flop while transistors 22 and 52 provide voltage sensing functions. Although terminals 10 and 12 are shown as positive and negative, this is a designation only for the particular embodiment of the circuit and it is to be realized that one of these terminals may be connected to ground or they may be easily reversed in respective polarity by reversing the polarity of each of the transistors contained herein.

In FIG. 2 a potentiometer generally designated as 120 has a resistance element connected between the positive terminal 122 and a negative terminal 124. A wiper of potentiometer 120 is connected to a reference output of an automatic scan generator 126 which may be the same as the circuit shown in FIG. 1. An output from generator 126 is connected to a first input 128 of a differential amplifier 130 having a second input 132 connected electrically to a wiper of a potentiometer generally designated as 134 having a resistance element connected in parallel with the resistance element of potentiometer 120. An output of the amplifier 130 is connected to control a motor 136 which is mechanically connected via a dashed line 138 to the wiper of potentiometer 134.

OPERATION

As previously indicated, the waveform generated by the circuit of FIG. 1 is obtained by charging and discharging capacitor 62 through the constant current generators utilizing transistors 58 and 82. The voltage level to which the capacitor is charged and discharged is controlled in part by the resistance elements utilizing potentiometer 112 and variable resistor 108, respectively. The multivibrator utilizing transistors 34 and 42 controls whether the current is being supplied to the capacitor 62 or discharged from capacitor 62.

It may be assumed that initially transistor 42 is conducting and therefore transistor 34 is nonconducting. Under these conditions transistor 82 is supplying current to capacitor 62. This result is obtained since the collector of transistor 34 is positive so that transistor 78 is biased to an ON condition. As the voltage across capacitor 62 increases, the output emitter of the darlington connected transistors 84 and 86 increases to a point where the output of poentiometer 112 causes transistor 52 to conduct. The collector voltage of transistor 52 then drops causing transistor 42 to be biased OFF and transistor 34 to conduct. When transistor 42 is nonconducting, its collector voltage is positive thus actuating the logic circuit comprising diodes 44 and 56 to turn transistor 58 to an ON condition and thereby start the discharge of capacitor 62. With transistor 34 conducting, the transistor 82 is turned to an OFF condition. The discharge of capacitor 62 will continue until the voltage at the emitter of transistor 86 drops to a level which biases OFF transistor 22. The collector voltage of transistor 22 then goes positive causing transistor 28 to conduct. Conduction of transistor 28 decreases the collector voltage thereof thereby turning transistor 34 to an OFF condition and thus reestablishing the originally assumed conditions.

As will be realized from the above description of operation, the variable resistor 108 may be adjusted to vary the low voltage point of the output waveform and potentiometer 112 may be varied to change the high voltage point of the output waveform. Further, the potentiometer 14, if the wiper 20 is connected to ground, may be utilized to vary the potential of the output waveform with respect to ground. The resistors 90–98 are utilized to provide various slopes in the rising voltage portion of the output waveform and if the output waveform is constant may obviously be replaced by only one resistor. If it is desired that the falling portion of the waveform be variable, this can be accomplished by providing a variable resistance for resistor 60 or utilizing a switch and a plurality of resistors in much the same fashion as the charging portion of the generator.

Referring to FIG. 2, it will be realized that if the scan generator 126 were removed from the circuit by a short circuit, the amplifier 130 would provide an output only when there is a difference in potential between the two inputs. Thus, any movement of the wiper of pot 120 would produce a difference potential which would actuate motor 136 to mechanically move wiper of potentiometer 134 to again establish balance conditions. By inserting the generator 126 as shown in FIG. 2, the output potential which is supplied to one of the inputs of differential amplifier 130 is varied with respect to the wiper of potentiometer 120 thus producing an output from amplifier 130 to actuate motor 136 so as to mechanically move the wiper of potentiometer 134 to reestablish the balance conditions at the input of differential amplifier 130. Thus, the motor will produce an oscillatory mechanical motion which coincides with the waveform of generator 126. One use for such a device is in a scan head of a radar or a sonar device wherein repetitive motions are required to provide a constant search pattern.

While other embodiments of the present invention will be apparent to those skilled in the art, I wish to be limited not by the embodiment shown but only by the scope of the appended claims wherein I claim:

1. Oscillating motor means comprising, in combination:

positive and negative power terminal means;

bridge circuit means compurising first and second potentiometer means connected between said positive and negative power terminal means wherein each of said potentiometer means has a variable output potential means and each of which is mechanically variable in potential with respect to the other;

motor means mechanically connected to said first potentiometer means for varying the potential of said first variable output potential means in response to an input signal;

differential amplifier means, including first and second input means, for supplying signals to said motor means to operate said motor means in response to a difference in signal supplied to said first and second input means of said amplifier means;

means electrically connecting said variable output potential means of said first potentiometer means to said first input means of said amplifier means;

oscillating means, including input means, for providing an alternating triangular waveform output signal with respect to said variable potential means of said second potentiometer means, connected to said second input means of said amplifier means for supplying triangular alternating output signals thereto and including means for varying the amplitude of the triangular waveform output signal to vary the amplitude of mechanical oscillations of said motor means; and means electrically directly connecting said variable output potential means of said second potentiometer means to said input means of said oscillating means.

2. Apparatus of the class described in claim 1 wherein said oscillating means comprises, in addition:

apparatus output means;

first regulated current means for supplying current to said output means in response to a first input signal;

second regulated current means for shunting the output in response to a second signal;

capacitor means connected to said output means and to said first and second regulated current means for charging at a constant rate when said first regulated current means receives said first input signal and for discharging at a constant rate when said second regulated current receives said second signal;

bistable multivibrator means connected to said first and second regulated current means for supplying said first and second input signals thereto;

high and low voltage sensing circuits connected to said apparatus output means for sensing a high voltage condition at said apparatus output means and connected to said multivibrator means for supplying a switching signal thereto to change the output signal of said multivibrator means from supplying said first input signal to supplying the second input signal whereby the capacitor means is discharged until such time as said low voltage sensing circuit senses a low voltage and supplies a signal to said multivibrator means for charging said capacitor means, the capacitor thereby linearly charging and discharging to produce a triangular output waveform at said apparatus output means.

References Cited

UNITED STATES PATENTS 2,826,726 3/1958 Mitchell ------------ 318—29

BENJAMIN DOBECK, Primary Examiner

U.S. Cl. X.R.

307—288; 318—28